United States Patent [19]
Cole

[11] 4,139,338
[45] Feb. 13, 1979

[54] AIR RING FOR THE PRODUCTION OF BLOWN FILM

[76] Inventor: Robert J. Cole, 224 St. George St., #501, Toronto, Ontario, Canada, M5R 2N9

[21] Appl. No.: 872,009

[22] Filed: Jan. 24, 1978

Related U.S. Application Data

[63] Continuation-in-part of Ser. No. 747,945, Dec. 6, 1976, abandoned.

[51] Int. Cl.² .................... B29C 25/00; B29D 7/20
[52] U.S. Cl. .......................... 425/72 R; 425/387.1; 264/565
[58] Field of Search .......... 425/72 R, 387.1, DIG. 2, 425/378 R; 264/89, 95, 237, 209

[56] References Cited

U.S. PATENT DOCUMENTS

| | | | |
|---|---|---|---|
| 3,754,067 | 8/1973 | St. Eve et al. ................... | 264/95 X |
| 3,835,209 | 9/1974 | Karabedian ...................... | 425/387 R |
| 3,930,768 | 1/1976 | Zimmermann et al. .......... | 425/72 R |
| 3,976,732 | 8/1976 | Herrington ...................... | 425/387 R |

*Primary Examiner*—Richard B. Lazarus
*Attorney, Agent, or Firm*—Hirons & Rogers

[57] ABSTRACT

The invention provides a new air ring for use with a die in a blown film process line to apply cooling air to the exterior surface of an extruded tube of film-forming material passing through the air ring. Air is discharged from a first downstream gap in the air ring radially outward from the path of movement of a tube in unexpanded state so as to create a vacuum force that urges the tube outward and causes the cooling air to flow along the surface, permitting the use of much higher velocities than hitherto, the increased cooling permitting increased output for a given size of die. A second upstream gap delivers a tubular stream that precools the tube and prevents it from sticking to the structure between the upstream and downstream gaps. A presently preferred structure consists of a deflector ring spaced from the remainder of the air ring body to form the second upstream gap and having the air from the upstream gap flowing over its inner surface, and an axially movable control ring surrounding the deflector ring, the downstream gap being formed between the deflector and control rings and adjustable in size by axial movement of the control ring.

12 Claims, 4 Drawing Figures

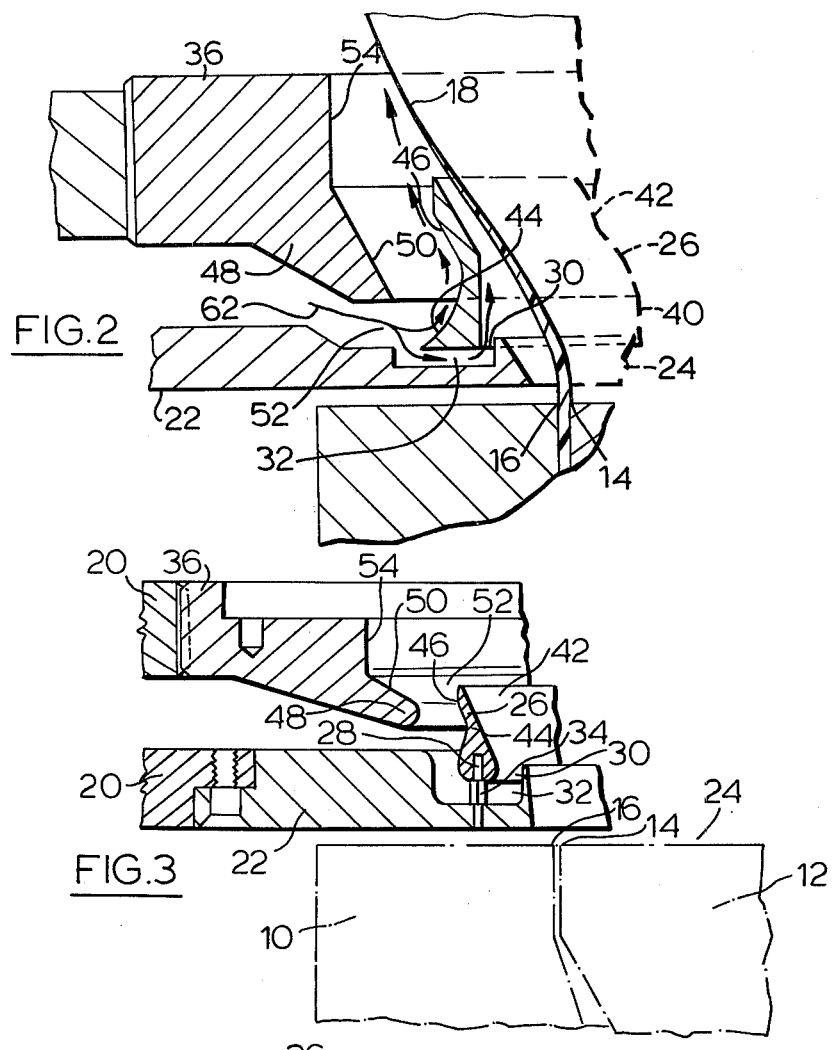
FIG.2
FIG.3
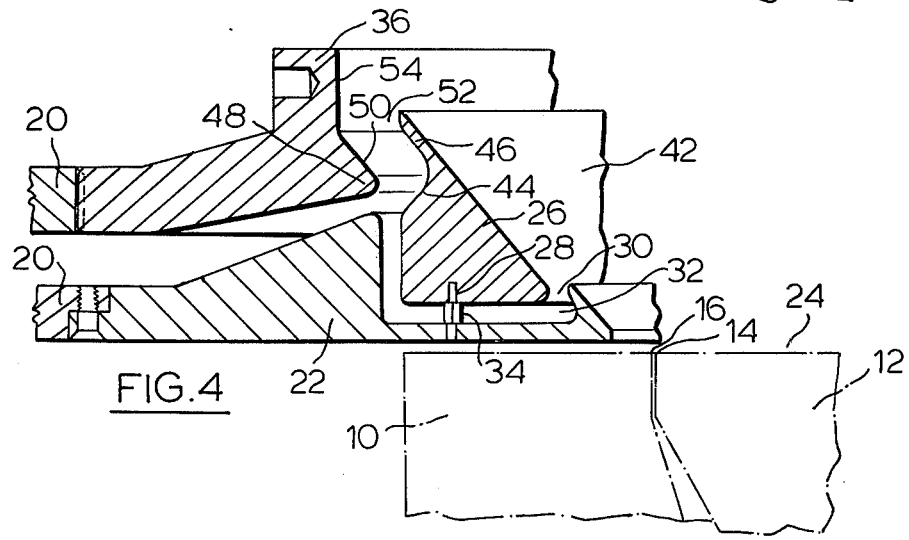
FIG.4

AIR RING FOR THE PRODUCTION OF BLOWN FILM

CROSS-REFERENCES TO RELATED APPLICATIONS

This application is a continuation-in-part of my application Ser. No. 747,945, filed Dec. 6, 1976, now abandoned in favour of the present application.

FIELD OF THE INVENTION

The present invention is concerned with improvements in and relating to air rings that are used with the dies employed in the production of blown films for applying cooling air to the exterior surface of a tube of the film-forming material as it is extruded from the die.

REVIEW OF THE PRIOR ART

In a typical continuous blown film process a hot polymer melt is fed to a die, from which it is extruded in the form of a tube that is nipped at a higher point to provide a bubble. This bubble usually is expanded by internal air pressure to provide a thinner film, which should be as uniform as possible in thickness, therefore requiring the production of a stable uniform bubble. The tube emerging from the die lips is unstable and remains so until it reaches the so-called "frost-line", at which the polymer has solidified sufficiently. The distance between the die lips and the frost line must be maintained within specific limits to ensure bubble stability, placing a consequent limitation on the speed at which the material can issue from the die.

In order to increase the production from a blown film process line it is now almost universal practice to blow cooling air on to the exterior surface of the tube as it emerges from the die, usually by means of an "air-ring" surrounding the tube. In some processes the air fed to the tube interior is re-circulated and cooled in an external cooler. The cooling effect of the air delivered by the air ring is determined principally by two parameters, namely its temperature and the volume that can safely be delivered to the surface. The air temperature cannot drop below the freezing point, or water will condense in the cooling system, so that only limited improvement can be obtained in this direction. The velocity of the cooling air that can be impinged on the issuing material is severely limited in that, if the force of the air impinging on the film becomes too great, the bubble becomes unstable and may even be torn from the die. This is why a typical output figure for a blown film line is only about 1-2 kg per hr. per cm. of die circumference, even if the die can produce over 4 kg. per hr. per cm.

DEFINITION OF THE INVENTION

It is therefore an object of the present invention to provide a new air ring for use with a blown film die.

In accordance with the present invention there is provided air ring means for supplying a cylindrical stream of cooling air to the exterior surface of a cylindrical tube of extruded and expanded plastic film-forming material in combination with, extrusion means of the kind including a die having spaced concentric circular die lips between which said tube is extruded along a tube path having a longitudinal extrusion axis, means for supplying air through the die to the interior of the extruded tube for radially-outward expansion thereof, and means for supplying a predetermined quantity of cooling air to the air ring means, the air ring means having extending therethrough tube passage means through which the said tube path passes, the air ring means comprising a hollow body having in its interior air receiving passage means having air inlet means thereto and air outlet means therefrom, the air supply means supplying the cooling air to the air ring inlet means for passage through the air-receiving passage means and discharge from the outlet means as a stream of greater than a predetermined minimum velocity, the outlet means being circular, surrounding the tube path, and discharging the cylindrical air stream around the tube path for application to the exterior surface of the extruded tube, said air outlet means discharging the cylindrical air stream in a direction having a component radially outward from the extrusion axis and with a velocity creating a force that urges the extruded tube radially outwards toward the stream whereby the stream flows over the tube exterior surface for the said cooling of the material thereof.

Also in accordance with the present invention there is provided air ring means for supplying first and second cylindrical streams of cooling air to the exterior surface of a cylindrical tube of extruded and expanded plastic film-forming material in combination with, extrusion means of the kind including a die having spaced concentric circular die lips between which said tube is extruded along a tube path having a longitudinal extrusion axis, means for supplying air through the die to the interior of the extruded tube for radially-outward expansion thereof, and means for supplying a predetermined quantity of cooling air to the air ring means, the air ring means having extended therethrough tube passage means through which the said tube path passes, the air ring means comprising a hollow body having in its interior air receiving passage means having air inlet means thereto and first and second air outlet means therefrom, the air supply means supplying the cooling air to the air ring inlet means for passage through the air-receiving passage means and discharge from the first outlet means as a first stream of greater than a predetermined minimum velocity, and from the second outlet means as a second stream of smaller flow volume than that of the first stream, both the said outlet means being circular, surrounding the tube path, and discharging their respective cylindrical air streams around the tube path for application to the exterior surface of the extruded tube;

the second outlet means being disposed upstream of the tube path with respect to the first outlet means, whereby the second air stream is applied to the exterior surface of the extruded tube prior to the application thereto of the first air stream, the first air outlet means discharging the first cylindrical air stream in a direction having a component radially outward from the extrusion axis and with a velocity creating a force that urges the extruded tube radially outwards toward the stream whereby the stream flows over the tube exterior surface for the said cooling of the material thereof.

Further in accordance with the present invention there is provided air ring means for supplying two successive cylindrical streams of cooling air to the exterior surface of a cylindrical tube of extruded and expanded plastic film-forming material upon extrusion of the tube from spaced concentric circular die lips and upon supply of cooling air to the air ring means, the air ring means comprising a body part having a cylindrical tube passage therein for passage therethrough of said cylindrical tube of plastic material along an extrusion axis with which the said aperture is concentric, the body portion being hollow to provide an air receiving passage means in its interior, the air receiving passage means having air inlet means thereto through which the air enters the body, a deflector ring member mounted on the body around the tube passage concentric therewith, a control ring member mounted on the body around the tube passage concentric therewith, the control ring member having a portion thereof spaced radially with respect to the said axis from a cooperating portion of the deflector ring to provide between the said portions a first circular air outlet means from the air receiving passage surrounding the said tube path, the deflector ring member and the control ring member having respectively a radially outer portion and a radially inner portion having respective spaced opposed surfaces, which surfaces both extend progressively radially outward at an acute angle relative to the extrusion axis to form between themselves the said first air outlet means which directs issuing air in the form of a radially outwardly travelling stream at a corresponding acute angle to the extrusion axis.

DESCRIPTION OF THE DRAWINGS

Air rings which are particular preferred embodiments of the invention will now be described, by way of example, with reference to the accompanying diagrammatic drawing, wherein:

FIG. 2 is a similar cross-section of part of the ring of FIG. 1 to a larger scale, and FIGS. 3 and 4 are similar cross-sections of respectively second and third rings embodying the invention.

DESCRIPTION OF THE PREFERRED EMBODIMENT

Figure 1:
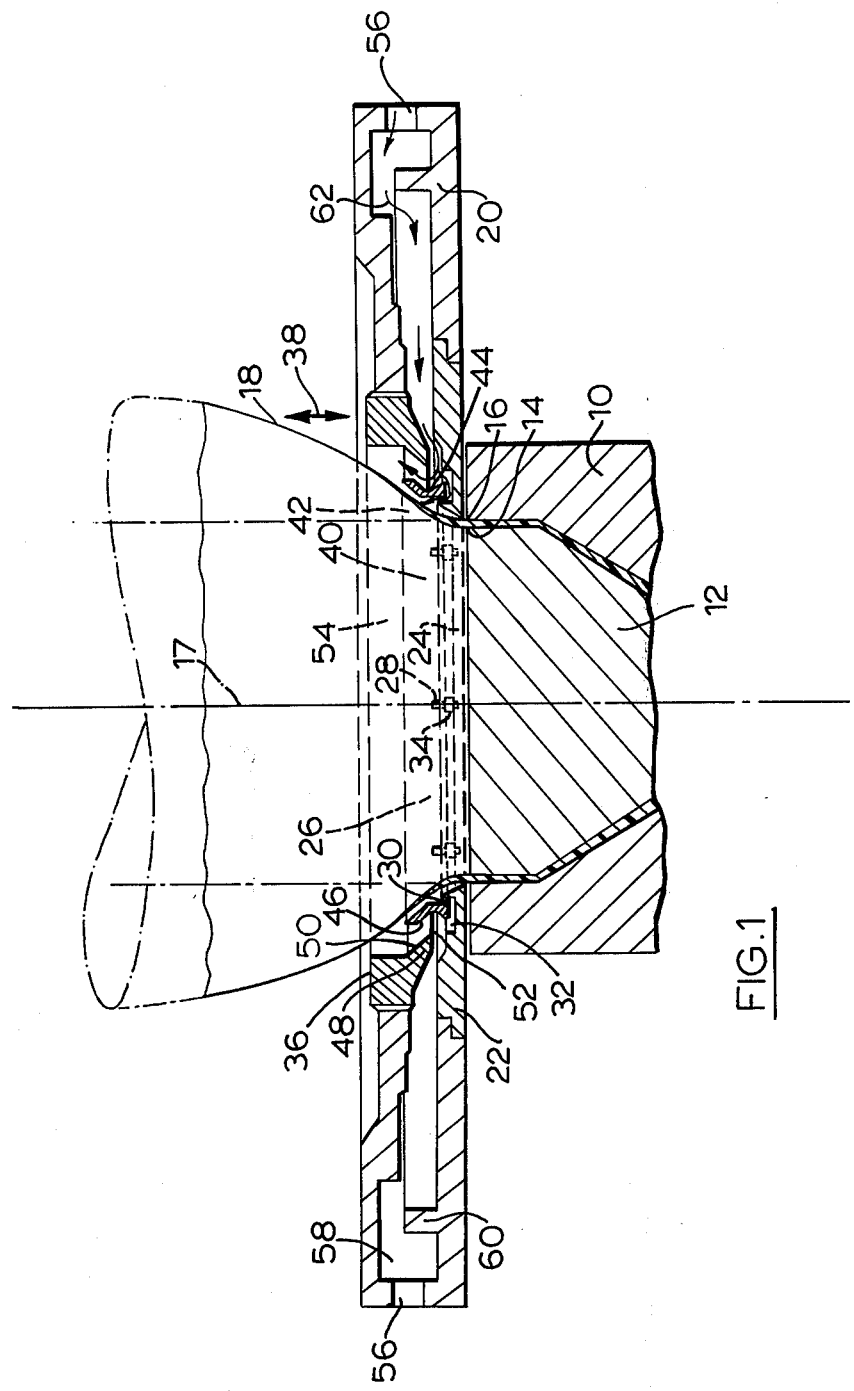
FIG. 1 is a diametric cross-section through a first ring and a cooperating die.

Referring now to FIGS. 1 and 2, the die is illustrated only schematically as consisting of a body 10 in which is mounted a core 12, thereby providing inner and outer circular die lips 14 and 16 respectively centered upon a longitudinal extrusion axis 17, and between which is extruded a cylindrical tube of melted polymeric material, indicated generally by the reference 18, the tube being symmetric about the axis 17. The air ring body consists of a body part 20 in which is mounted a bottom ring 22 having therein a central circular aperture 24 centered on the axis 17 and through which the tube 18 passes; the wall of this aperture 24 is inclined radially outwardly relative to the axis 17 in the direction of movement of the tube. In the description which follows, and in the claims, the use of the terms "radially" and "axially" will relate to the extrusion axis 17, unless otherwise specified. A deflector ring 26, whose shape will be discussed in detail below, is mounted a prescribed distance above the ring 22 coaxial therewith by means of a plurality of vertical pins 28, so as to leave a radially-extending circular gap 30 between the bottom edge of the ring 26 and the adjacent downstream edge of the aperture 24, the ring bottom edge extending downward somewhat into a groove 32 in the upper surface of the ring 22, so that one axial passage is formed directing the issuing tubular oil stream axially. The relative axial location of the rings 22 and 26 is set by the axial dimension of spacing washers 34 on the pins 28, the arrangement being such as to provide the minimum possible obstruction to the uniform flow of air through the gap 30.

An oil flow control ring 36 is screw-threaded into the upper part of the body part 20, so that it is movable vertically, as indicated by arrows 38, upon its rotation in the body part. The inner surface of the deflector ring 26 comprises an upstream vertically-extending, uniform-radius portion 40 merging smoothly into a downstream portion 42 of progressively increasing radius. The upstream portion of the deflector ring is of progressively decreasing thickness to provide a rear upstream face 44 of concave shape, while the downstream portion is of substantially uniform thickness to provide a rear upstream face 46 of about the same slope as the face 42. The control ring 36 has a downwardly and inwardly projecting portion 48, the inner surface 50 of which approximately parallels the rear surface 46. The upstream edge of the projection 48 cooperates with the adjacent face of the ring 22 to form a gap 52 whose axial dimension, and therefore its flow capacity, can be determined by vertical adjustment of the ring 36, as described above. In this embodiment the remaining upstream surface 54 of the ring 36 facing the tube 18 is of uniform radius, but in other embodiments may be sloped.

The pressurized cooling air is delivered to the interior of the ring from an external source (not illustrated) via a plurality of circumferentially-shaped inlets 56. As is known to those skilled in the art it is important for effective operation of an air ring that a smooth non-turbulent flow of air be directed at the emerging tube, but means for achieving such flows are known to such persons and do not form part of the present invention, and therefore are not illustrated. The air delivery system may also need to permit the air ring to rotate with the die, if a rotating die is employed, but again the specific nature of such a system does not constitute part of the present invention. For simplicity of illustration the entering air is shown as entering a ring-shaped plenum chamber 58 and then passing over an axial baffle 60 to enter a ring-shaped passage feeding the air radially inwards to the two gaps 30 and 52, the air flow direction being indicated by arrows 62.

The majority of the air issues from the upper downstream gap 52 in the form of a higher velocity tubular stream that is directed by the radially-outwardly inclined surface 46 radially outwards from the path of a tube in unexpanded state issuing from the die lips. The air escaping from the gap 52 at high velocity produces a vacuum by venturi effect in the space between the ring surface 54 and the tube, the gap being operative as the venturi throat, and this vacuum urges the issuing tube evenly radially outwards, expanding it into the air stream in a manner such that the stream flows along the tube wall for highly effective cooling without producing the deleterious forces produces when the stream is aimed against the tube. This uniform vacuum force maintains a uniform gauge profile or wall thickness of the expanded tube, and also restrains the bubble against vibration or pulsation that might otherwise be created by impinging air. A smaller quantity of air issues from the lower upstream gap 30 in the form of a lower velocity tubular stream (as compared to that of the stream from the gap 52) directed along the path of movement of the tube. This upstream stream flows over the inner surfaces 40 and 42 of the deflector ring 26, to ensure that the molten polymer of the tube cannot stick to the inner surfaces and thereby cause puncturing of the bubble, while providing initial cooling for the tube outer surface.

In order to understand the manner in which the apparatus of the invention operates it is instructive to compare it with conventional apparatus known to me hitherto in which the cooling air is directed at the tube. Typically a low density resin of melt index 2 can withstand an impinging air stream of velocity from 1,400–1,700 m.p.m. and remain stable. If this velocity is increased then the buffeting of the tube by the air stream may cause oscillations to start, and usually control cannot be maintained above 2,100 m.p.m. Such unstable condition is corrected by increasing the orifice size to decrease the air velocity, or by decreasing the air supply, thereby sacrificing cooling and production.

With my new air ring in which the issuing air stream is deflected away from the path of the unexpanded tube by the deflector ring 26, and the tube is drawn into the air stream by the vacuum force, the air preferentially follows along the surface of the tube by the action of surface forces, this effect also being assisted by the heat exchange taking place between the film and the air. With the apparatus of the invention, if oscillation commences, perhaps because the frost line has climbed and the melt expansion angle has therefore decreased, correction is achieved by lowering the ring 54, thereby increasing the inclination of the issuing air stream away from the tube; at the same time the air velocity is increased as the gap 52 is narrowed so that a more powerful vacuum is created to hold the tube more firmly. This will pull the frost line down and increase the melt expansion angle to give the required stability.

As is described above, in this embodiment the deflector ring 26 is fixed in position, so that the gap 30 is of fixed dimensions and therefore, adjustments of the gap 52 will affect the relative volumes of air flowing through the upper and lower gaps. Since as described above, the tube is urged into the exiting air stream which preferably follows the tube surface, there is little or no tendency of the impingement to shear the molten material, and it is found that considerably higher volumes and velocities can be employed than with prior art air rings of which I am at present aware.

As described above, the upstream orifice 30 provides a small amount of initial cooling and this assists in quickly stabilizing the molten material of the tube 18. The vacuum of the downstream orifice is applied to the tube very soon after it issues from the die lips, and is operative to pull the tube out to a relatively large diameter over a relatively short distance, much before the pressurized air in the bubble could begin to produce the same effect, quickly thinning the wall of the tube so that the heat to be withdrawn from the tube material more quickly than is possible by direct impingement of air against the tube exterior. As an air ring of the invention is brought into operation and the tube 18 expands outwards, the bubble is observed to "lock" into a stable position in which there is a very narrow gap between itself and the downstream edge of the deflector ring 26, and thereafter the air flows should be adjusted to maintain this stable preferential position.

As a specific example may be mentioned an air ring intended for use with a die of 10 cm. diameter operating with polymer of melt index 2, a blow-up ratio of 2:1 and producing film of thickness 1–1.5 mil. The air ring is operated with a minimum air velocity of 1,800 m.p.m. and preferably at almost 2,250 m.p.m., up to about 2,400 m.p.m. This permits an increase in air velocity and volume of about 50% over prior art apparatus operating at 1,000 m.p.m., and the increased cooling gives an increase in output of at least about 25–50%. The use of my new air rings with dies of larger diameter cannot give such large increases in output, and the increase obtainable with a die of 35 cm. diameter is of the order of 15%. The principal parameter in determining the air velocity to be employed is the melt index figure, and for a fractional index value of about 0.3 the minimum operating velocity would be about 3,000 m.p.m. with a preferred operating value about 4,500 m.p.m.

The proportion of the total air supply issuing from the upstream gap will usually be about 15–25% and it is preferred that it issue without excessive velocity. It is a commercially important feature of my new air ring that it has a relatively small axial length and, for example, the air rings mentioned above will have an axial length of about 6.25 cm. This short distance will permit a wide range of blow-up ratios (e.g. from about 1.25:1 to about 7:1) to be used without the expanded tube fouling the walls of the "chimney" formed by the ring, so that there is no need to provide a series of rings, each usable with a much narrower range (e.g. 1.25:1 to 2.5:1), as with prior art constructions known to me.

The embodiment of FIG. 3 is a development of the embodiment of FIGS. 1 and 2, wherein the surfaces 40 and 42 of the latter have been merged into a single radially outwardly sloping surface. It will be noted particularly that both the deflective ring 26 and the control ring 36 are designed to avoid the presence of sharp edges in the paths of the air flows through the apparatus, so as to minimize noise produced at such edges.

The embodiment of FIG. 4 is intended for use with dies of larger diameter than those of FIGS. 1 to 3, and to this end the bottom ring 22, the deflector ring 26 and the control ring 36 are designed to provide a greater radial spacing and a greater axial spacing between the two gaps 30 and 52, so as to obtain the required draw-out ratio for the plastic tube of greater diameter. The operation of all three embodiments is fundamentally the same.

I claim:

1. Air ring means for supplying a cylindrical stream of cooling air to the exterior surface of a cylindrical tube of extruded and expanded plastic film-forming material in combination with,
   extrusion means of the kind including a die having spaced concentric circular die lips between which said tube is extruded along a tube path having a longitudinal extrusion axis,
   means for supplying air through the die to the interior of the extruded tube for radially-outward expansion thereof, and
   means for supplying a predetermined quantity of cooling air to the air ring means, the air ring means having extending therethrough tube passage means through which the said tube path passes, the air ring means comprising a hollow body having in its interior air receiving passage means having air inlet means thereto and air outlet means therefrom, said air ring body including a deflector ring member and a control ring member mounted thereby concentric with one another and surrounding the said tube path concentric therewith, the control ring member having at least a portion thereof surrounding the deflector ring member, the air supply means supplying the cooling air to the air ring inlet means for passage through the air-receiving passage means and discharge from the outlet means as a stream of greater than a predetermined minimum velocity, the outlet means being circular, surrounding the tube path, and discharging the cylindrical air stream around the tube path for application to the exterior surface of the extruded tube, the said outlet means being provided between a radially outer portion of the deflector ring and a radially-inner portion of the control ring, the said radially-outer portion of the deflector ring and the said radially inner portion of the control ring having respective spaced opposed surfaces, which surfaces both extend progressively radially outward relative to the extrusion axis, and one of the rings being mounted by the air ring body for axial movement thereon parallel to the extrusion axis to determine the size of the outlet means formed between the said opposed surfaces, and said air outlet means discharging the cylindrical air stream in a direction having a component radially outward from the extrusion axis and with a velocity creating a force that urges the extruded tube radially outwards towards the stream whereby the stream flows over the tube exterior surface for the said cooling of the material thereof.

2. Air ring means as claimed in claim 1, wherein the control ring member is mounted by the air ring body for said axial movement and is screw-threaded into the air ring body for rotation about the extrusion axis, the said rotation of the control ring producing the said axial movement thereof.

3. Air ring means as claimed in claim 1, wherein the said radially-outer portion of the deflector ring provides a progressively radially-outwardly extending cylindrical surface, and the last-mentioned surface is preceded in the air receiving passage means by a cylindrical radially-outer surface of concave shape, the two cylindrical surfaces merging smoothly into one another.

4. Air ring means as claimed in claim 1, wherein the deflector ring member has a circular radially-inner portion thereof spaced from a circular cooperating portion of the air ring body to form between said portions a second outlet means for air from the air receiving passage means in the air ring body, the said second outlet means being circular, surrounding the tube path, and discharging a second cylindrical air stream around the tube path for application to the exterior surface of the extruded tube prior to the application to the tube exterior surface of the first-mentioned cylindrical air stream.

5. Air ring means as claimed in claim 4, wherein the deflector ring member has a radially inner surface portion extending from the said second air outlet means progressively radially outwards with respect to the extrusion axis, over which surface the second cylindrical air stream flows between itself and the extruded tube to prevent adherence of the expanded tube to the last-mentioned surface.

6. Air ring means as claimed in claim 4, wherein the volume of air flowing in the said second cylindrical air stream is between 15% and 25% of that flowing the first-mentioned cylindrical air stream.

7. Air ring means for supplying first and second cylindrical streams of cooling air to the exterior surface of a cylindrical tube of extruded and expanded plastic film-forming material in combination with, extrusion means of the kind including a die having spaced concentric circular die lips between which said tube is extruded along a tube path having a longitudinal extrusion axis, means for supplying air through the die to the interior of the extruded tube for radially-outward expansion thereof, and means for supplying a predetermined quantity of cooling air to the air ring means, the air ring means having extending therethrough tube passage means through which the said tube path passes, the air ring means comprising a hollow body having in its interior air receiving passage means having air inlet means thereto and first and second air outlet means therefrom, said air ring body including a deflector ring member and a control ring member mounted thereby concentric with one another and surrounding the said tube path concentric therewith, the control ring member having a portion thereof surrounding the deflector ring member with the said first air outlet means provided between them, and the deflector ring member having a portion thereof surrounding a cooperating portion of the air ring body with the said second air outlet means provided between them, the air supply means supplying the cooling air to the air ring inlet means for passage through the air-receiving passage means and discharge from the first outlet means as a first stream of greater than a predetermined minimum velocity, and from the second outlet means as a second stream of smaller flow volume than that of the first stream, both the said outlet means being circular, surrounding the tube path, and discharging their respective cylindrical air streams around the tube path for application to the exterior surface of the extruded tube, the second outlet means being disposed upstream of the tube path with respect to the first outlet means, whereby the second air stream is applied to the exterior surface of the extruded tube prior to the application thereto of the first air stream, the first air outlet means being provided between a radially-outer portion of the deflector ring and a radially-inner portion of the control ring, wherein the said portions both extend progressively radially outward relative to the extrusion axis, and wherein one of the rings is mounted by the air ring body for axial movement thereon parallel to the extrusion axis to determine the size of the said first air outlet means, the first air outlet means discharging the first cylindrical air stream in a direction having a component radially outward from the extrusion axis and with a velocity creating a force that urges the extruded tube radially outwards toward the stream whereby the stream flows over the tube exterior surface for the said cooling of the material thereof.

8. Air ring means as claimed in claim 7, wherein the volume of air flowing in the said second cylindrical air stream is between 15% and 25% of that flowing in the first-mentioned cylindrical air stream.

9. Air ring means as claimed in claim 7, wherein the deflector ring member has a radially inner surface portion extending from the said second air outlet means progressively radially outwards with respect to the extrusion axis, over which surface the second cylindrical air stream flows between itself and the extruded tube to prevent adherence of the expanded tube to the last-mentioned surface.

10. Air ring means as claimed in claim 9 wherein the said second air outlet means discharges the second stream axially along the tube path between the tube and the said deflector ring member radially inner surface portion.

11. Air ring means as claimed in claim 7, wherein the control ring member is mounted by the air ring body for said axial movement and is screw-threaded into the air ring body for rotation about the extrusion axis, the said rotation of the control ring producing the said axial movement thereof.

12. Air ring means as claimed in claim 7, wherein the said radially-outer portion of the deflector ring provides a progressively radially-outwardly extending cylindrical surface, and the last-mentioned surface is preceded in the air receiving passage means by a cylindrical radially outer surface of concave shape, the two cylindrical surfaces merging smoothly into one another.

* * * * *